United States Patent [19]

Yokoi et al.

[11] Patent Number: 4,818,074
[45] Date of Patent: Apr. 4, 1989

[54] PROJECTION DEVICE FOR IRRADIATING A LIGHT TO A DISPLAY DEVICE AND OPTICALLY MAGNIFYING AND PROJECTING A REFLECTION LIGHT THEREFROM

[75] Inventors: Kenya Yokoi, Yokohama; Takamichi Enomoto, Shiroyamamachi; Fuyuhiko Matsumoto, Kawasaki; Wasaburo Ohta, Yokohama; Toru Miyabori, Kawasaki; Akihiko Kanemoto, Yokohama; Haruo Iimura, Yokohama; Takaaki Miyashita, Yokohama, all of Japan

[73] Assignee: Ricoh Company, Ltd., Tokyo, Japan

[21] Appl. No.: 91,668

[22] Filed: Sep. 1, 1987

[30] Foreign Application Priority Data

| Sep. 3, 1986 | [JP] | Japan | 61-135178[U] |
| Oct. 20, 1986 | [JP] | Japan | 61-249139 |
| Dec. 18, 1986 | [JP] | Japan | 61-302335 |
| Mar. 10, 1987 | [JP] | Japan | 62-34900[U] |
| Mar. 23, 1987 | [JP] | Japan | 62-42312[U] |
| Mar. 23, 1987 | [JP] | Japan | 62-42313[U] |
| May 8, 1987 | [JP] | Japan | 62-112039 |
| May 28, 1987 | [JP] | Japan | 62-133204 |
| May 29, 1987 | [JP] | Japan | 62-135519 |
| Jul. 8, 1987 | [JP] | Japan | 62-170501 |
| Aug. 20, 1987 | [JP] | Japan | 62-207317 |
| Aug. 25, 1987 | [JP] | Japan | 62-210617 |

[51] Int. Cl.[4] .............................................. G02F 1/13
[52] U.S. Cl. .................................. 350/338; 350/331 R; 350/345
[58] Field of Search .................. 350/331 R, 337, 338, 350/345

[56] References Cited

U.S. PATENT DOCUMENTS

| 3,950,078 | 4/1976 | Zatsky | 350/337 X |
| 4,043,640 | 8/1977 | Berreman | 350/337 |
| 4,185,895 | 1/1980 | Stephens et al. | 350/338 X |
| 4,190,832 | 2/1980 | Mohler | 350/337 X |
| 4,213,810 | 7/1980 | Heynisch et al. | 350/337 X |
| 4,268,127 | 5/1981 | Oshima et al. | 350/337 |
| 4,613,207 | 9/1986 | Fergason | 350/331 R |

FOREIGN PATENT DOCUMENTS

| 0080027 | 6/1983 | European Pat. Off. |
| 0211211 | 2/1987 | European Pat. Off. |
| 2040061 | 8/1980 | United Kingdom |
| 2058384 | 4/1981 | United Kingdom |
| 2153620 | 8/1985 | United Kingdom |

Primary Examiner—Stanley D. Miller
Assistant Examiner—Richard Gallivan
Attorney, Agent, or Firm—Oblon, Fisher, Spivak, McClelland & Maier

[57] ABSTRACT

A projection device for irradiating a light to a display device and optically magnifying and projecting a reflection light therefrom includes a liquid crystal cell, a first polarization device and a reflection device disposed respectively on the opposite side from the irradiated side of the liquid crystal cell and a second polarization device and optical magnifying means disposed respectively on an optical path of the reflection light reflected by said reflection device and outgoing from said liquid crystal cell.

8 Claims, 13 Drawing Sheets

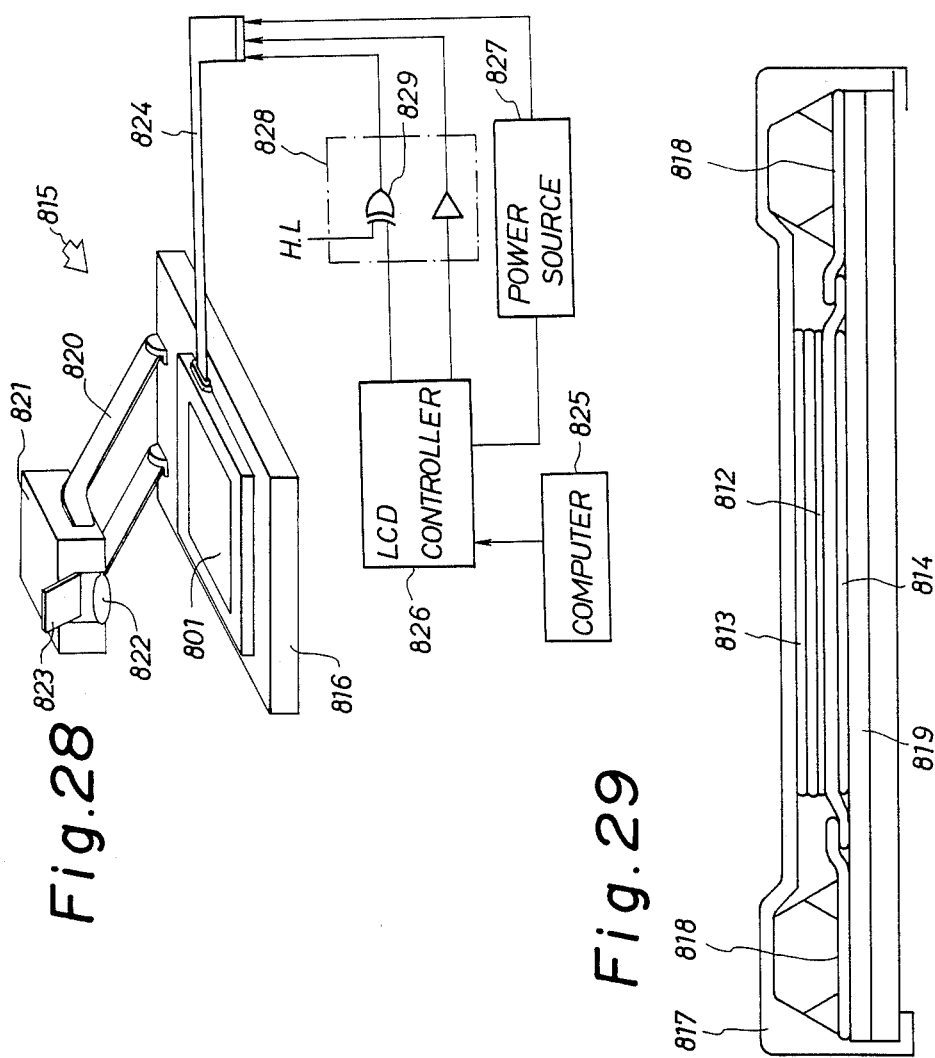

PROJECTION DEVICE FOR IRRADIATING A LIGHT TO A DISPLAY DEVICE AND OPTICALLY MAGNIFYING AND PROJECTING A REFLECTION LIGHT THEREFROM

BACKGROUND OF THE INVENTION

1. Field of the Invention

The present invention concerns a reflection type magnifying projection device such as an OHP (overhead projector) using a transmission type liquid crystal device as an image displaying medium.

2. Discussion of Background

In an overhead projector (OHP), the content of information written on a transparent film can be displayed under magnification by using an optical system. If the transparent film is replaced with a liquid crystal device, it can facilitate the rewriting, continuous display or coloration, etc. of the information.

SUMMARY OF THE INVENTION

A liquid crystal display device comprises a liquid crystal cell and a polarization plate or a reflection plate used as required. In a twisted nematic (TN) type liquid crystal display device or the like used most generally at present, two polarization plates having a liquid crystal cell put therebetween are used. If such a liquid crystal display device is used merely in place of a transparent film in an OHP and when a reflection light from the liquid crystal display device is magnified and projected, since the incident light to the liquid crystal display device is projected after passing the two polarization plates twice respectively, that is, four times in total, there has been a problem that the amount of transmission light is decreased to make the screen dark. Further, the situation is similar in the case of using an single polarization plate as in a guest-host (GH) type liquid crystal display device. Since the incident light to the liquid crystal display device passes through an identical polarization plate twice also in this case, the amount of light to be projected is decreased considerably. In a conventional transmission type liquid crystal display device, a liquid crystal cell comprising liquid crystals sealed between glass substrates is used and, accordingly, letters or patterns are deviated in a double image state due to the thickness of such glass plate. However, it is impossible to reduce the thickness of the glass substrate to zero and a certain thickness is required in view of the strength as well. Further, since the transmission type liquid crystal display device is merely placed on a reflection type Fresnel lens on an OHP device, a gap is liable to be caused between them. The presence of such a gap also displays letters patterns as double images on a screen, thereby worsening the display quality.

When light is irradiated to a liquid crystal display device and then magnified and projected, a halogen lamp, tungsten lamp, etc. has usually been used as a light source. However, since the liquid crystal display device has a wavelength dependency of the light transmittance, the image density may some time be reduced relatively to worsen the contrast if such a dependency is not taken into consideration.

In the projection device of this type, it is necessary to increase the amount of the irradiation light by a light source (intensity of irradiation light) in order to make the state of display brighter or in order to provide a brighter display state. However, since the polarization plate suffers from a characteristic change such as degradation in the degree of polarization or deformation of shape due to the thermal effect of the irradiation light, there is a restriction to the intensity of the irradiation light. As a result, the projection image is relatively dark and difficult to see in the case of the conventional liquid crystal magnifying and projection device.

It has been known that a heat spot is generated on a screen in a reflection type OHP. The situation is similar in the case of disposing a transmission type liquid crystal cell as a display medium on a reflection type OHP and projecting the image under magnification. The heat spot is generated due to the reflection, particularly, of a portion of the irradiation of light at the surface of the polarization plate on the incident side or the reflection in the liquid crystal cell. Such a heat spot is projected as a bright spot on a screen. Accordingly, such a heat spot displayed on the screen, causes a substantial reduction in the contrast for the entire image to lower the display quality.

In view of the above, there has been a liquid crystal cell using a plastic film as a transparent support plate. Since the thickness of the transparent support plate can be reduced to about 100 μm, no double image is formed when it is applied to a reflection type projection device. However, since the plastic film has an optical anisotropy, it provides a drawback of causing iridescent color thereby coloring the image, reducing the contrast, etc. Particularly, since a voltage is applied to an information indicating portion of a liquid crystal cell in the conventional device and the coloration of the liquid crystal cell is projected as it is, even a slight color shading becomes conspicuous.

The first object of the present invention is to improve the brightness of a projected image in a device of magnifying and projecting a reflection light from a liquid crystal display device.

The second object of the present invention is to eliminate the occurence of double images caused by the thickness of a transparent support plate for the liquid crystal cell;

The third object of the present invention is to prevent the reduction in the contrast of the brightness of the projection image caused by the wavelength dependency of a irradiation light;

The fourth object of the present invention is to provide a device capable of increasing the intensity of an irradiation light to the liquid crystal cell;

The fifth object of the present invention is to avoid the formation of a heat spot caused by the reflection of the irradiation light at the surface of a polarization plate, etc. thereby obtaining uniform contrast; and The sixth object of the present invention is to prevent coloration to a projected image caused by the optical anisotropy of plastic films in a projection device using, a liquid crystal cell having a transparent support plate made of plastic films as a display device.

The first object of the present invention can be attained by a projection device for irradiating a light to a display device and optically magnifying and projecting a reflection light therefrom, comprising:

a liquid crystal cell, a first polarization means and a reflection means disposed respectively on the opposite side from the irradiated side of the liquid crystal cell, and a second polarization means and an optical magnification means disposed respectively on the optical path of the reflection light reflected by the reflection means and outgoing from the liquid crystal cell.

The second object of the present invention can be attained by the device wherein the thickness of at least one of the transparent substrate plates for the liquid crystal cell is less than 0.5 mm or the device wherein the distance between the liquid crystal cell and the reflection means comprising a reflection type Fresnel lens is less than 1.5 mm.

The third object of the present invention can be attained by the substantially irradiating only the light, to the liquid cell, of a wavelength having greatest variation in the light transmittance between ON and OFF of a voltage that controls the transmission/screening of the liquid crystal cell.

The fourth object of the present invention can be attained by the device wherein the second polarization means comprises a polarization mirror.

The fifth object of the present invention can be attained by applying a surface treatment to the polarization plate for preventing the generation of heat spot caused by the reflection of light at the surface of the polarization plate.

The sixth object of the present invention can be attained by setting the twisting angle of liquid crystal molecules to 180–250 degrees, setting the angle between the orientation direction of the liquid crystal molecules on each of transparent support plates made of plastic films and the axis of transmission or the axis of absorption of the polarization means in adjacent with each of the transparent support plates to 30–60 degrees and setting the product $(d \cdot \Delta n)$ between the refractive index anisotropy $\Delta n$ of the liquid crystal at an ambient temperature and the thickness d of the liquid crystal layer so as to satisfy the relationship: $-0.0023\alpha + 1.2 \leq d \cdot \Delta n \leq 0.0023\alpha + 1.5$, disposing one of the polarization means so that the axis of transmission or the axis of absorption makes an angle of 90 degrees with respect to that of the other of the polarization means, and connecting an inversion driving circuit to the liquid crystal cell for applying no voltage to an information indicating portion and applying a voltage to non information indicating portion of the liquid crystal cell.

According to the present invention, since the number of passing times of the light from a light source through the polarization plate is decreased, the attenuation of light is reduced and, accordingly, a bright projected image can be obtained.

Further, a projected picture with no double image can be obtained by reducing the thickness of the transparent support plate for the liquid crystal cell to less than 0.5 mm.

Further, contrast of the projected image can be improved by adapting such that only the light of a wavelength having the greatest transmittance variation between ON and OFF of the control voltage applied to the liquid crystal cell is irradiated to the liquid crystal cell.

Further, the intensity of the irradiation light can be increased and the projected image can be made bright by using a thermally resistive polarization mirror having optical analyzing function in place of the polarization plate.

Further, a projected image easy to see with uniform contrast can be obtained by applying surface treatment to the polarization plate or the protection plate for eliminating a heat spot formed by the reflection at the surface thereof.

Furthermore, in a case where the transparent support plate of the liquid crystal cell is made of plastic film, coloration to the projected image caused by the optical anisotropy of the plastic films can be prevented by setting the twisting angle of liquid crystal molecules, the angle made the orientation direction of liquid crystal molecules on the transparent support plate and the axis of transmission or the axis of absorption of the polarization plate and the thickness of the liquid crystal layer to optimum values respectively and by using an inversion circuit for applying no voltage to information indicating portion and applying a voltage to non information indicating portion of the liquid crystal cell.

BRIEF DESCRIPTION OF THE DRAWINGS

The present invention will now be explained more specifically while referring to the following drawings. The present invention is not limited only to the following examples.

FIG. 28 is a circuit diagram in the eleventh embodiment according to the present invention;

FIG. 29 is a longitudinal cross sectional view for the liquid crystal display device in the eleventh embodiment;

DESCRIPTION OF THE PREFERRED EMBODIMENTS

The projection device of the invention comprises basically a first polarization means for polarizing the light irradiated from a light source, a reflection means for reflecting the polarized light produced by the first polarization means, a liquid crystal cell for receiving the polarized light reflected by the reflection means and then rotating selectively a polarization plane by 90 degrees in accordance with voltage application thereto, a second polarization means for transmitting selectively the polarized light passing the liquid crystal cell in accordance with the rotation of polarization plane and an optical magnifying means for magnifying the polarized light transmitted through the second polarization means in order to project the light on a screen.

Figure 1:
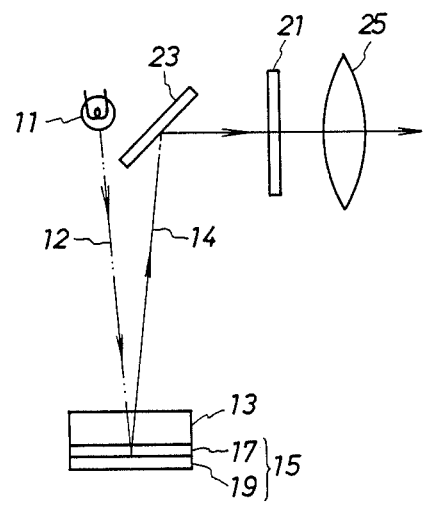
FIG. 1 is an explanatory view for the first embodiment according to the present invention.
Figure 2:
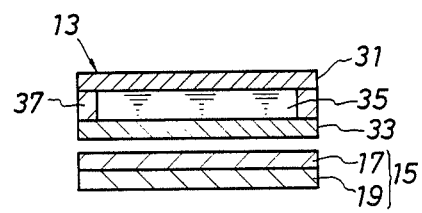
FIG. 2 is a view illustrating the structure of a reflection polarization plate in the first embodiment.

FIG. 1 is a constitutional view showing the first embodiment of the projection device according to the present invention. In the figure, a liquid crystal display device comprises a TN type liquid crystal cell 13, a reflection polarization plate 15 and an optical analyzing member 21 (second polarization plate). The reflection-polarization plate 15 comprises a polarization member (first polarization plate) as the first polarization means and a reflection plate as the reflection means integrated to each other also as shown in FIG. 2, in which a reflection layer 19 (reflection plate) is disposed at the back of a polarization member 17. The liquid crystal cell 13 comprises opposing substrates 31, 33 having transparent electrodes for display formed thereon and applied with orientation treatment, between which liquid crystals 35 are sealed. Reference numeral 37 denotes a seal portion.

Light irradiated from a light source 11 enters into the liquid crystal cell 13, polarized when passing through the polarization member 17 of the reflection polarization plate 15 into a polarized light, reflected at the reflection layer 19 and then again enters the liquid crystal cell 13 by way of the polarization member 17. In this case, the polarization plane of the reflection light does not rotate at selection points (voltage applied portions) of the liquid crystal cell 13, while the polarization plane rotates by 90 degrees at non-selected points. Only one of the reflection light thus written with information is selectively transmitted in the optical analyzing member 21 as the second polarization means disposed an optical light path 14 of the reflection light and projected after being magnified in a lens 25 (magnifying optical system). Reference numeral 23 denotes a mirror.

Since the optical analyzing member 21 is disposed out of the optical path 12 of the incident light to the liquid crystal cell 13, the light from the light source 11 passes through the optical analyzing member 21 only once and the number of passing times through the polarization plate is decreased. As a result, reduction in the amount of the transmission light can be prevented thereby projecting a projected image with a large amount of light. While, if the optical analyzing member is disposed in adjacent with the liquid crystal cell 13 as in the usual liquid crystal display device, since the optical analyzing member situates on the optical path of the incident light to the liquid crystal cell, the light from the light source 11 transmits twice the optical analyzing member, by which the amount of the transmission light is decreased and the screen becomes dark.

While FIG. 1 shows such a case where the optical analyzing member 21 as the second polarization means is disposed in front of the lens 25, it may be situated at the back (on the right side in the Figure) of the lens 25, that is, the magnifying optical system. Further, in a case where the optical analyzing member is not required as in the case of using the device as an ordinary OHP by projecting the information written on a transparent film, the optical analyzing member may be made movable on and out of the optical path of the reflection light such as by mounting the member to a rotational arm so that the optical analyzing member can freely be detached. Further, the second polarization means may be disposed in contact with the liquid crystal cell not apart from the cell as in FIG. 1.

The liquid crystal cell is not restricted only to the TN type but any other type such as GH type can be applied so long as a polarization plate is used.

Figure 3:
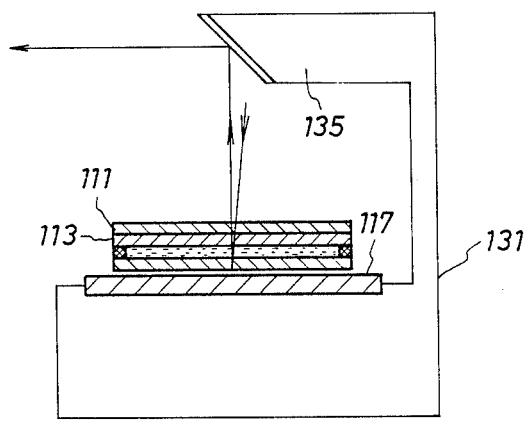
FIG. 3 is an explanatory view for the second embodiment according to the present invention.

FIG. 3 is a constitutional view showing the second embodiment of the projection device according to the present invention. In this embodiment, the polarization-reflection plate formed with the first polarization means and reflection means integrally, is used. A TN type liquid crystal cell 113 and an optical analyzing member 111 are plated on a polarization-reflection plate 117 formed to the main body of an OHP 131, and a liquid crystal display device comprises a polarization-reflection plate 117, the liquid crystal cell 113 and the optical analyzing member 111. The polarization-reflection plate 117 is made of a metal thin film. The metal thin film exhibits an elliptic polarizing nature and functions in the same manner as the usual polarization plate in combination with the liquid crystal cell, by which thin and dense display appears corresponding to ON-OFF of the liquid crystal cell. As the metal thin film, any of those metals employed usually can be used so long as it has a good reflectance and Al and Ni can be used, for example.

The light irradiated from an OHP optical system 135 is transmitted through the optical analyzing member 111 as the second polarization means and the liquid crystal cell 113, reflected at the polarization-reflection plate 117, transmitted again through the liquid crystal cell 113 and the optical analyzing member 111 and projected from the OHP optical system 135. In this case, since the polarization-reflection plate 117 composed of the metal thin film acts as the polarization plate, that is, as the polarization member, the reflection light is transmitted through the optical analyzing member 111 selectively depending on the rotation of the polarization plane in the liquid crystal cell 113 and projected by the OHP optical system 135. In this way, the polarization-reflection plate 117 has both the function as the polarization plate and the function as the reflection plate.

The light entering from the OHP optical system 135 to the liquid crystal display device is transmitted twice through the optical analyzing member 111 but since it is reflected only once at the polarization reflection plate 117, reduction in the amount of the projection light can be prevented considerably and a bright image can be displayed.

Figure 4:
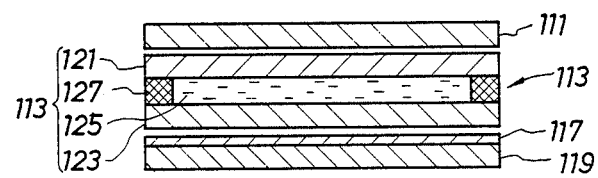
FIG. 4 is a cross sectional view of a liquid display device in the second embodiment.

Further, in a case where the polarization-reflection plate 117 is integrated with the liquid crystal cell, it can be used as an ordinary OHP when the liquid crystal display device is not used. FIG. 4 is a cross sectional view illustrating the constitutional embodiment of such a liquid crystal display device, in which the TN type liquid crystal cell 113 is put between the optical analyzing member 111 and the polarization-reflection plate 117. Reference numeral 119 denotes a support member for supporting the polarization-reflection plate (metal thin film) 117. The liquid crystal cell 113 has such a structure that liquid crystals 125 are sealed between an upper substrate 121 and a lower substrate 123 having transparent electrodes formed thereon and applied with orientation treatment. Reference numeral 127 denotes a seal material. If such a liquid crystal display device is merely placed on the OHP 131 for enlarging projection, there is a drawback that a difference in the optical path length is brought about depending on the thickness of the upper and the lower substrates 121, 123, by which the projected image is doubled. Although the drawback may be overcome by reducing the thickness of the substrate, if the thickness of the substrate made of glass is so reduced to such an extent that a sufficient improving effect can be obtained, the substrate is liable to be damaged by the impact shock and causes an extreme inconveniency for the handling. While, if a plastic film is used as the substrate, the thickness can be reduced sufficiently due to its flexibility. Further, since the plastic film is light in the weight, the weight of the OHP can also be reduced.

Figure 5:
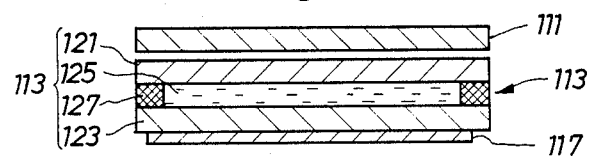
FIG. 5 is a view illustrating another embodiment of the liquid crystal device in the second embodiment.

FIG. 5 shows another constitutional embodiment of an integral type liquid crystal display device, in which a liquid crystal cell 113 is constituted by using a substrate 123 formed with a polarization-reflection plate (metal thin film) 135.

Furthermore, polarization-reflection plate may have a Frensnel structure with an aim of improving the imaging property and the efficiency. The groove pitch in the Fresnel structure can properly be set depending on the purpose.

Figure 6:
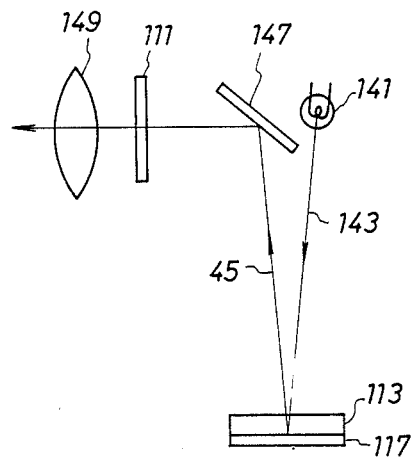
FIG. 6 is a view illustrating a modification of the second embodiment.

FIG. 6 is an explanatory view illustrating a modification of the second embodiment. An optical analyzing member 111 is situated out of an incident optical path 143 of the light from a light source 141 and situated on a reflection optical path 145 of the reflection light from a polarization reflection plate 135. Reference numeral 147 denotes a projection reflection mirror and 149 denotes a lens. Since the light from the light source is transmitted through the optical analyzing member 111 only once, the decrease in the amount of light can further be prevented. The optical analyzing member 111 may also be disposed in front of the lens 147.

Figure 7:
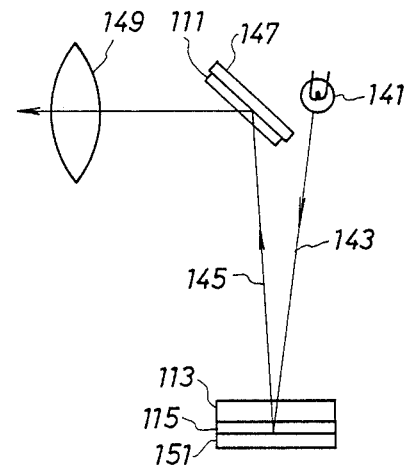
FIG. 7 is a view illustrating another modification of the second embodiment.
Figure 8:
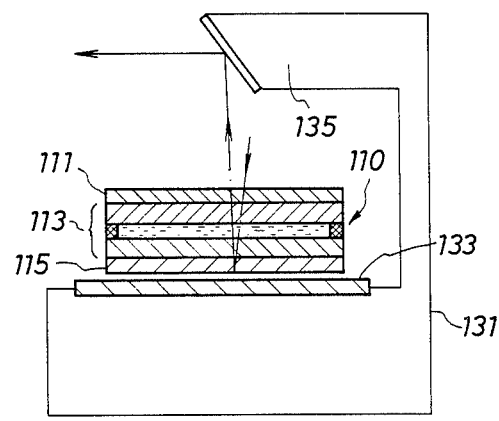
FIG. 8 is an explanatory view for a conventional projection device.

FIG. 7 is an explanatory view for another modification of the second embodiment, in which a polarization member 115 (polarization plate) and a reflection plate 151 equipped with Fresnel lens are successively disposed on the rear side of a liquid crystal cell 113, and an optical analyzing member 111 is mounted on a projection-reflection mirror 147 of an OHP optical system. Since projection-reflection mirror 147 is situated out of an incident optical path 143 from a light source 141, light is passed there through only once. Accordingly, the number of times that the light passes through the optical analyzing member is decreased and the reduction in the amount of transmission light can be prevented to obtain a bright projected image more easy to observe compared with the conventional device as shown in FIG. 8 in which light is transmitted through the optical analyzing member twice. With such a constitution, usual polarization plate can be used as the polarization member and the optical analyzing member.

While the explanations have been made mainly for the TN type liquid crystal display device, the present invention is not particularly limited only to such a type of liquid crystal device but it can be applied to any of those devices, for example, super-twisted type TN liquid crystal display device and dielectric liquid crystal display device so long as they use a polarization plate.

As mentioned above, the explanations have been made to the basic conception of the invention referring to FIGS. 1 to 8. Further explanations will be made to technical embodiments according to the invention, which are able to effect technical advantages based on the basic conception of the invention.

Figure 9:
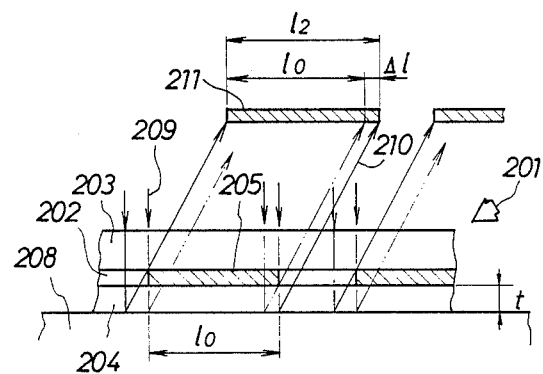
FIG. 9 is an explanatory view for the third embodiment according to the present invention.

The projection device of the invention, wherein thickness of at least one of transparent support plates of the liquid crystal cell is less than 0.5 mm, can provide magnified projection with no image shifting or blurring. Such a projection device is shown in FIG. 9 as a third embodiment according to the invention.

In a transmission type liquid crystal cell 201 irradiated with an incident light 209, transmission light is reflected at the lower surface of a transparent support plate 204 to form an reflection image 211 by a reflection light 210 corresponding to the picture image 205. In this case, since the plate thickness t of the transparent support plate 204 is thin, the size $l_2$ of the reflection image 211 is similar with the size $l_0$ of the picture element 205 and the extent of the image shifting $\Delta l$ can be reduced to such an extent as causing no problems in view of display, thereby obtaining above mentioned advantages.

The image shifting $\Delta l$ can be of course reduced to 0, theoretically, if the plate thickness t is set to 0, but this is actually impossible.

Further, although a transparent support plate made of glass may be used actually, if the plate thickness is reduced to less than 0.5 mm, it tends to be broken. Then, if a liquid crystal cell is formed by using a substrate, for example, made of a plastic film as a transparent support plate from a practical point of view, it is possible to provide a magnified projection image with no worry for the damage and with no substantial shifting or blurring in the image.

Figure 10:
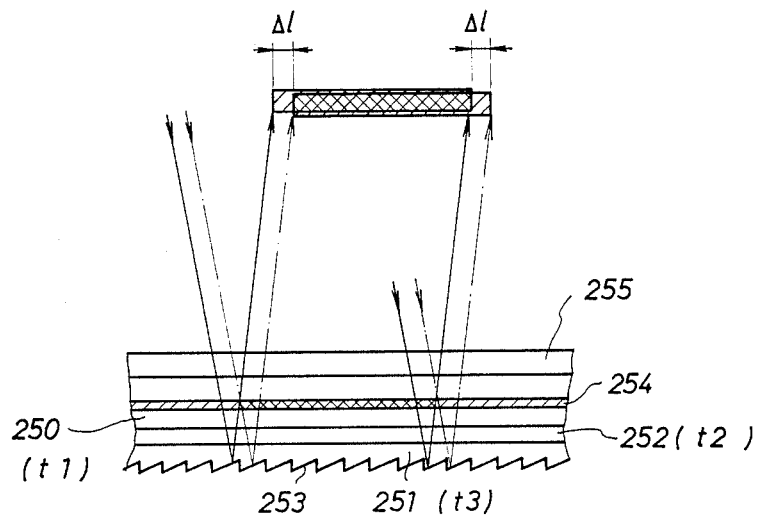
FIG. 10 is an explanatory view for the fourth embodiment according to the present invention.
Figure 11:
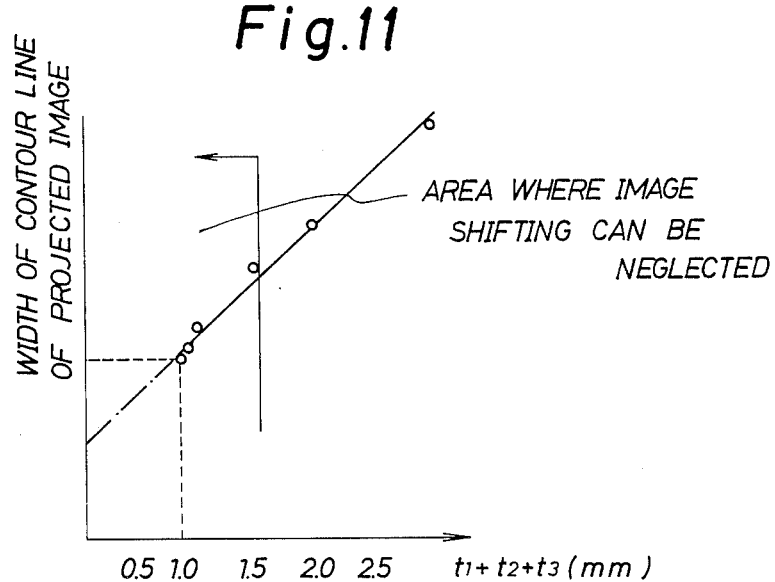
FIG. 11 is a graph showing the relationship between the total thickness for a transparent support plate, polarization plate and a fresnel lens and blotting of a projected image.

The projection device of the invention wherein a reflection type Fresnel lens is used as the reflection means and the distance between a liquid crystal layer of the liquid crystal cell and a reflection film of the Fresnel lens is less than 1.5 mm, can prevent effectively a substantial image shifting and image blurring in the magnified projection image. Such a projection device is shown in FIG. 10 as a fourth embodiment according to the invention.

In this embodiment, a thin substrate made of glass or plastic film is used for the lower substrate 250 of a liquid crystal cell and a liquid crystal display device having a driving circuit substrate mounted thereon is disposed on a reflection type Fresnel lens 251 and the image is projected by a reflection type OHP. As a fundamental constitution, the thickness of the cell is made so small as to satisfy the relationship : $t_1+t_2+t_3 \leq 1.5$ mm, where $t_1$ is the thickness of the lower substrate 250 as the transparent support plate, $t_2$ is the plate thickness of the lower polarization plate 252 and $t_3$ is the thickness of the Fresnel lens 251. Specifically, the light transmitting through the liquid crystal layer passes through the lower substrate 250, the lower polarization plate 252 and the Fresnel lens 251 and is reflected on the reflection film 253. Accordingly, if the distance between the liquid crystal layer 254 and the reflection film 253 is increased, image shifting $\Delta l$ is formed as shown in FIG. 10.

Figure 13:
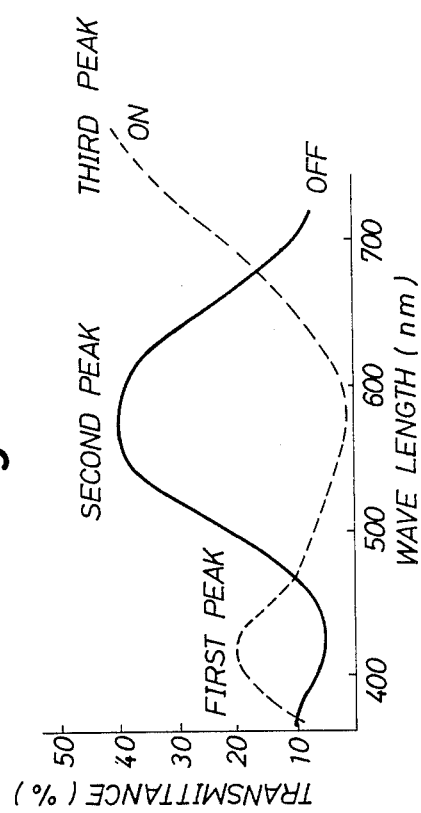
FIG. 13 is a graph showing the wavelength dependency of the light permeability of the liquid crystal display device.

If the value : $t_1+t_2+t_3$ described above is less than 1.5 mm, as shown in FIG. 13, the image shifting or blurring is actually negligible for a magnified projection image.

Explanation will further be made to this embodiment. A liquid crystal display device portion is formed by bonding a lower polarization plate 252 and an upper polarization plate 255 of 0.15 mm plate thickness respectively to a liquid crystal cell using a plastic film of 0.1 mm thickness as a lower substrate 250. In this case, if the liquid crystal substrate and the polarization plate are adhered, the interface with an air layer is eliminated to obtain a bright projected image, whereas if they are bonded closely projected images of different tones can be obtained by replacing the polarization plate. Generally, the liquid crystal display device portion as described above is closely bonded on a reflection type Fresnel lens of 0.8 mm thickness used for a reflection type OHP. In this case, $t_1+t_2+t_3=1.05$ mm, in which the distance between a liquid crystal layer 254 and a reflection film 253 is sufficiently reduced to decrease the extent of image shifting and blurring in the projection image to such a negligible extent as causing no substantial problem. In case, a glass substrate of about 0.8 mm thickness is used for the lower substrate 250 of the liquid crystal cell, image shifting can be prevented by the use of a thin lens of less than 0.5 mm thickness as the Fresnel lens.

Figure 12:
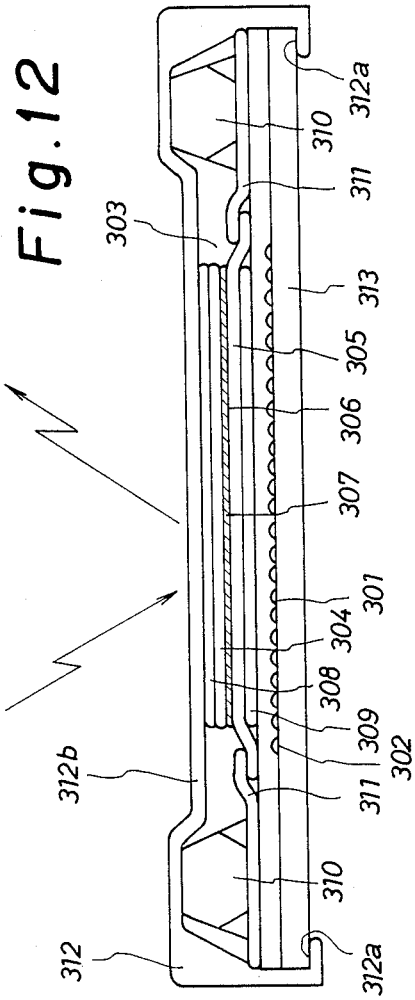
FIG. 12 is an explanatory view for the fifth embodiment according to the present invention.

The projection device of the invention, wherein a reflection type Fresnel lens is used as the reflection means and the projection device has a package member comprising a resilient pressing portion for holding the liquid crystal display device and the Fresnel lens integrally with each other in a tightly bonded state, can provide a magnified projection image with high quality and no image shifting. Explanation will be made to such a projection device as a fifth embodiment according to the invention while referring to FIG. 12. A reflection type Fresnel lens 302 having a sinusoidal cross sectional shape and formed with a reflective Al membrane 301 at the surface is disposed. Such a reflection type Fresnel lens 302 is similar to a reflection type Fresnel lens disposed to the illumination reflection portion in an OHP device. A liquid crystal display device 303 is placed and set on such a reflection type Fresnel lens 302. The liquid crystal display device 303, has a liquid crystal cell 307, as a display medium, in which liquid crystals 306 are sealed between transparent substrates 304 and 305 having transparent electrodes for matrix wiring, etc. The display device comprises a polarization plates of the liquid crystal cell 307, a driving IC 310 and a flexible wiring substrate 301 for connecting the driving IC 310 with the lower transparent substrate 305 of the liquid crystal cell 309. In this embodiment, the transparent substrates 304, 305 and the polarization plates 308, 309 of the transmission type liquid crystal display device 303 are made of plastic films.

A package member 312 is disposed for integrally holding the Fresnel lens 302 and the transmission type liquid crystal display device 303 in a tightly bonded state while placing the transmission type liquid crystal display device 303 on the Fresnel lens 302. The package member 312 is made of a flexible and resilient transparent member and it comprises a holding portion 312a for holding the lower circumferential surface of the Fresnel lens 302 and a resilient pressing portion 312b concaved downwardly from the portion corresponding to the driving IC 310 and brought into press-contact with the upper surface of the transmission type liquid crystal display device 303 for tightly bonding the device on the Fresnel lens 302. Reference numeral 313 denotes a reinforcing plate.

The liquid crystal unit integrated thus by the package member 312 is made detacheable to a reflection type OHP device, by which the application use can be extended.

The operation of the liquid crystal unit according to this embodiment upon use will be considered. At first, light is irradiated on the side of the upper polarization plate 308 through the package member 312, transmitted through the transmission type liquid crystal display device 303 and then reflected on the Fresnel lens 302. In this case, if the relationship : $t_1+t_2+t_3=0$ is established for the thickness $t_1$ of the lower polarization plate 309, the thickness $t_2$ of the lower transparent substrate 305 and the thickness $t_3$ of the reflection type Fresnel lens 302, the image shifting can be reduced to 0. However, since each of the members actually has a certain plate thickness, such a constitution is impossible. In this embodiment, however, the transparent plate 309 and the transparent substrate 305 are made of plastic films and the each thickness of the plates, is small. Accordingly, the image shifting is reduced so small as causing no actual problem in view of the display. Further, since the transmission type liquid crystal display device 303 is urged by the resilient pressing portion 312b of the package member 312 and held in a tightly closed state with no gap between both of them, the shifting in the reflection image due to the gap can be eliminated. Particularly, since the display device 303 is mainly composed of plastic films in this embodiment, a good bondability can be obtained.

In this way, by the use of the liquid crystal unit according to this embodiment, a display image at high quality can be obtained with no such image deviation as causing double image in the reflection image. Further, since the liquid crystal unit comprises the transmission type liquid crystal display device 303 and the reflection type Fresnel lens 302 integrated by the package member 312, it can be manufactured as an extremely thin structure, reduced in the weight, with less number of components and at a low cost.

The projection device of the invention, wherein the scope of wave length of the light to be irradiated is controlled corresponding to wave length dependency in light transmission-screening characteristics of liquid crystal device in order that the light other than the light having wave length, the transmittance variation upon ON-OFF of which is greatest, is eliminated, can improve effectively the contrast in the magnified projection image. Explanation will be made in detail to such a projection device as a sixth embodiment according to the invention while referring to FIGS. 13 to 17.

In the case of projecting the content of information displayed on a liquid crystal display device under magnification by using a reflection or transmission type OHP or other projection device, a halogen lamp is usually used as a light source. FIG. 13 shows one example of the wave length dependency of light transmittance of a super twisted nematic (STN) type liquid crystal display device. Light impermeable (light-screened) peaks are formed in a visible region corresponding to ON-OFF signals to the liquid crystal display device, which are displayed by projection as dense and thin area of the image and can be recognized visually. That is, it is adapted that the transmittance is lowered near 600 nm to screen the light if an ON signal is applied, whereas the light is transmitted upon application of an OFF signal.

However, since the transmission-screening characteristic of the STN type liquid crystal display device has a wave length dependency, there is such a wave length region where the light transmittance is increased even if the ON signal is inputted. Referring to FIG. 13, the characteristic is as : ON→not transmitting (light screening) and OFF→transmitting at the second peak near 600 nm. While, the transmittance is increased upon ON state at the first peak near 400 nm and at the third peak longer than 700 nm and the transmission-screening characteristic is rather reversed as: ON→transmitting and OFF→ not transmitting.

Figure 14:
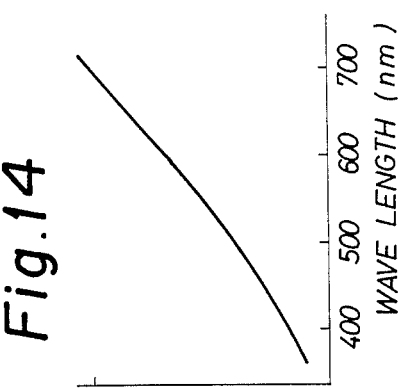
FIG. 14 is a graph showing a relationship between the wave length of light and the radiation intensity of a halogen lamp.

In view of the above, if the light including the wave length for all of the first, second and third peaks, for example, the light from a halogen lamp having the wave length distribution as shown in FIG. 14 is irradiated, undesired effects of the first and the third peaks are developed. That is, upon ON state, while the light at the second peak is screened to display a predetermined image, the light of the first and third peaks is transmitted to reduce the contrast and the quality of the projected image. Further, since the light near the first and the third peaks is not completely screened upon OFF state, the contrast is again lowered.

In view of the above, taking notice of the wave length dependency of the transmittance-screening characteristics of such a liquid crystal display device, the relative contrast is improved in this embodiment by substantially not irradiating the light other than the light within the wave length area where the transmittance variation is greatest upon ON-OFF (the light in the wave length region near the first and the third peaks in FIG. 13) but irradiating the light in the wavelength area corresponding to the second peak in FIG. 13. The wave length region to be cut depends on the characteristics of the liquid crystal display device, it is desirable to cut the light at a wave length longer by 50 nm and shorter by 50 nm than the wave length in which the transmittance variation is greatest between ON and OFF states.

While the foregoing explanation has been made to the case where the light is screened when the input signal to the liquid crystal cell is OFF, the situation is the same to the liquid crystal display device showing the characteristics as; OFF→light screening and ON→transmission.

Irradiation of the light selected with respect to wave length as described above can be realized by cutting unnecessary wave length. A filter or mirror is used as a cutting means. Further, it can also be attained by using a light source having a narrow emission wave region. In this case, neither the filter nor the mirror is required and the light from the light source can be utilized at a high efficiency. For instance, in case of a STN type liquid crystal display device having the spectral characteristics shown in FIG. 13, if a sodium lamp is used as the light source, leak light upon ON state can substantially be eliminated since the light from the sodium lamp is concentrated at the wave length near 589 nm. Further, since the emission efficiency of the sodium lamp is 4 or 5 times higher compared with that of a halogen lamp or the like, the efficiency of utilizing light relative to the supplied energy is outstandingly greater and the power consumption can be reduced remarkably to suppress the heat generation with respect to an identical level of brightness.

Figure 15:
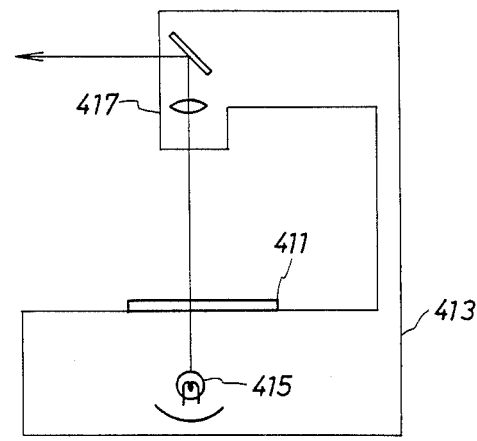
FIG. 15 is an explanatory view for the sixth embodiment according to the present invention.

FIG. 15 is an explanatory view illustrating an embodiment in which the present-invention is applied to a transmission type OHP. The light is irradiated from a light source 415 to a STN type liquid crystal display device 411 mounted on an OHP main body 413 and magnified by a magnifying projection optical system 417 of the OHP, and the display information inputted to the liquid crystal display device 411 is displayed by projection. A light source of a narrow emission wave length range such as a sodium lamp is used as the light source 415.

Figure 16:
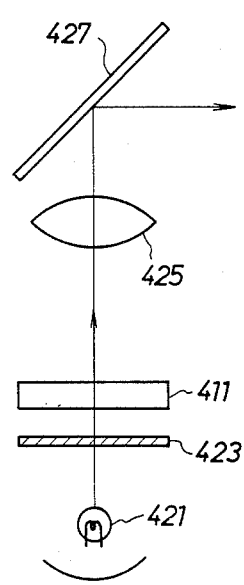
FIG. 16 is a view illustrating a modification of the sixth embodiment.

FIG. 16 shows a modification of the sixth embodiment using a filter for selectively transmitting the light within a predetermined wave length region. Light from a light source 421 such as a halogen lamp is filtered by a filter 423, loaded with an image information in a liquid crystal display device 411, magnified in a magnifying optical system 425, reflected by a mirror 427 and then projected.

Figure 17:
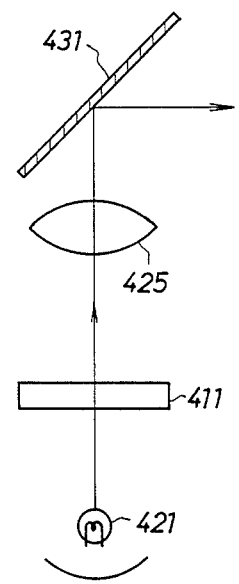
FIG. 17 is a view illustrating another modification of the sixth embodiment.

FIG. 17 is an explanatory view illustrating another modification of the sixth embodiment using a wave length adjusting mirror for selectively reflecting the light within a predetermined wave length region. Such a mirror is known, for example, as a dichroic mirror. The light from the light source 421 is entered into the liquid crystal display device 411, loaded with the image information and magnified in a magnifying optical system 425, and the light within a predetermined wave length region (light near the second peak, referring to FIG. 13) is selectively reflected by a wave length adjusting mirror 431 and then projected.

In case of using a wave length adjusting filter, mirror or the like as shown in FIG. 16 or 17, the light may be cut at a position before the entrance to the liquid crystal display device or on the optical path after the transmission of the liquid crystal cell to the screen.

Further, although the foregoing explanations have been made mainly to the STN type liquid crystal display device, the liquid crystal display device is not restricted only thereto and any device having the wave length dependency for the transmittance can be used. In the STN type liquid crystal display device, a liquid crystal cell is put between two sheets of polarization members, in which liquid crystal molecules are sandwiched between the substrates so as to be oriented substantially horizontally relative thereto, the liquid crystal molecules have a twisted structure in the direction of the thickness between both of the substrate and the angle of twisting is greater than that of the conventional TN type (for example greater than 160 degrees). Such a device has been reported for example, as a Super Twisted Birefringence Effect type liquid crystal device (T. J. Scheffer, et al, SID Digest 120 (1985)).

Figure 18:
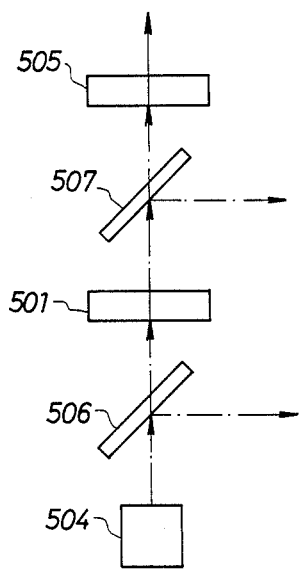
FIG. 18 is an explanatory view for the seventh embodiment according to the present invention.
Figure 19:
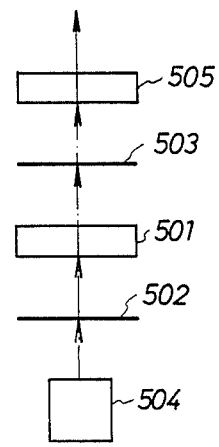
FIG. 19 is an explanatory view for a conventional liquid crystal display device equipped with two polarization plates.

The projection device of the invention, wherein a polarization mirror for extracting only the light having predetermined polarization component from the light outgoing from the liquid crystal display device is disposed as at least the second polarization means, can provide a clear magnified projection image under intense irradiated light. Explanation will be made to such a projection device as a seventh embodiment according to the invention while referring to FIG. 18. In the seventh embodiment, the first and second polarization means are a polarization mirrors 506, 507 disposed on the axis of the optical path before and after the liquid crystal cell 501. Each of the polarization mirrors 506, 507 is disposed in a state inclined by 45 degrees relative to the plane perpendicular to the optical axis. The polarization mirror 506 permits to pass the light therethrough which consists of certain polarization component, but does not pass but reflect the light which consists of other polarization components. That is, the polarization effect of light irradiated to the liquid crystal cell 501 is identical with the case of the polarization plate 502. Further, the polarization mirror 507 permits the light to pass therethrough which consists of certain component, but does not pass but reflect the light which consists of other components. That is, the polarizing directions of the transmission light from the polarization mirrors 506, 507 are different by 90 degrees from each other, in which the polarization mirror 506 functions as a polarization member, while the polarization mirror 507 functions as the optical analyzing member.

In this embodiment, the polarization mirror 506 is used for polarization before entrance to the liquid crystal cell 501, while the polarization mirror 507 is used for analyzing the light on the exit side. Since the polarization mirrors 506, 507 are thermally resistive, if the intensity of the irradiation light from the light source 504 is increased, they exhibit polarizing and light analyzing effects without causing degradation in the polarizing effect and thermal deformation. As a result, the image by the liquid crystal cell 501 can be projected and displayed in a bright state under the irradiation of intense light.

By the way, when a video projector is experimentally manufactured using a STN (super twisted nematic) type liquid crystal cell of a dot matrix type with 256 dot×256 dot constitution as the liquid crystal cell 501 and the polarization mirrors 506, 507 as in this embodiment, it is possible to obtain a projected image with the brightness twice as high as that in the conventional projected image using the polarization plates 502, 503 as usual.

The irradiation light to the liquid crystal cell 501 is not necessarily polarized, but it is simply required that only the light of a predetermined polarizing direction, among the light outgoing from the liquid crystal cell 501, is analyzed and transmitted by the polarization mirror 507 and, accordingly, the polarization mirror 506 is not always necessary. That is, laser beams, etc. with a larger beam diameter may be irradiated directly to the liquid crystal cell 501.

Figure 20:
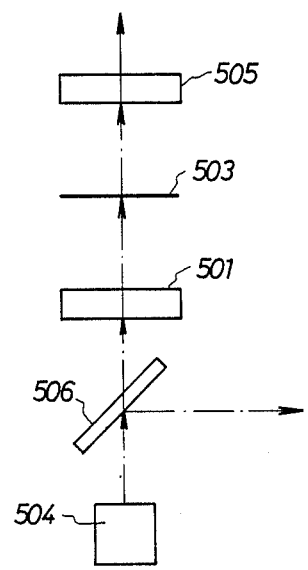
FIG. 20 is a view illustrating a modification of the seventh embodiment.

FIG. 20 illustrates a modification of the seventh embodiment. In this modified embodiment, the polarization mirror 506 is used only for the polarization before entrance to the liquid crystal cell 501 and, since the polarization mirror 506 is thermally resistive, it shows the polarizing effect without suffering from the degradation in the polarization effect and thermal deformation even if the intensity of the irradiation light from the light source 504 is increased. As a result, it is possible to project and display the image from the liquid crystal cell 501 in a bright state under the irradiation of an intense light.

The projection device of the invention, wherein a surface treatment is applied to a heat spot-generating portion in the polarization plate as the second polarization means, can provide a magnified projection image with uniform contrast. Explanation will be made to such a projection device as an eighth embodiment according to the invention while referring to FIG. 21.

Figure 21:
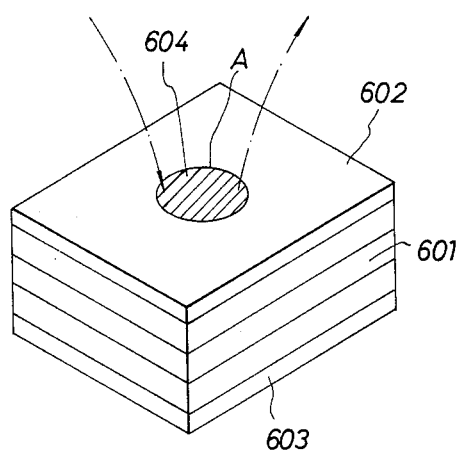
FIG. 21 is an explanatory view for the eighth embodiment according to the present invention.

FIG. 21 shows the liquid crystal display cell with a such a structure that the polarization plate 602, the transmission type liquid crystal 601 and the polarization plate 603 are arranged in this order from the incident side. Such liquid crystal display cell is disposed on the glass surface of a reflection type OHP and the image displayed in the transmission type liquid crystal cell 601 is reflected and projected for display when light is irradiated from the side of the polarization plate 602.

Considering the polarization plate 602 under irradiation of light, a heat spot can be generated at the central portion as shown by a circular region A in the drawing. This is caused by the energy of light, in the irradiation light, which is reflected by the polarization plate 602. In this embodiment, a surface treatment is applied to such a portion in which the heat spot can be produced, that is, to the circular region A to constitute a reflection preventive layer 604. That is, the portion in the circular region A is applied with a surface treatment for reducing intensity of the reflection light. Such a reflection preventive layer 604 may be formed, for example, by a vapor deposition or coating process in order that the transparent dielectric layer satisfies the 367 relation: $nd = \lambda/4$, where nd represents a refractive index of the transparent dielectric layer and $\lambda$ represents the wavelength of the irradiated light. Such a transparent dielectric member may be made of magnesium fluoride. Further, it may be formed as a multi-layered film structure.

Since the reflection preventive layer 604 is formed at the heat spot-generating portion, the reflection characteristic is reduced in the circular region A than other region of the polarization plate 602 and the generation of the heat spot can relatively be suppressed. As a result, a projected image easy to see where the contrast over the entire screen surface is made uniform, can be obtained.

Figure 22:
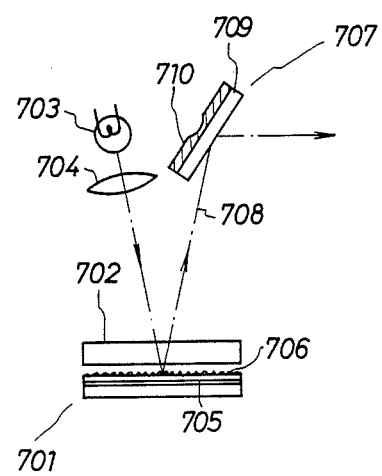
FIG. 22 is an explanatory view for the ninth embodiment according to the present invention.
Figure 23:
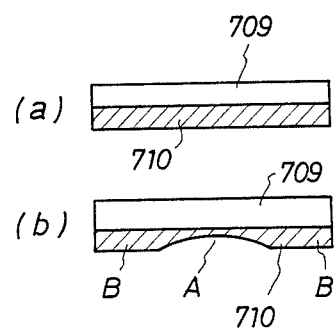
FIG. 23 is an explanatory view for the surface treatment to a reflection mirror in the ninth embodiment.

Although the reflection preventive layer 604 is formed as the light permeable surface treatment in this embodiment, various types of permeable surface treatment can be applied with no particular restrictions. For example, the intensity of the reflection light may be reduced by forming fine unevenness or by laminating a film formed with fine unevenness to the surface within the circular region A of the polarization plate 602, thereby partially diffusing the reflection light from the heat spot-generating portion. As one of methods of unifying contrast in the magnified projection image, there is a method in which at least one of the Fresnel reflection plate and the reflection mirror is applied with reflection-reducing treatment to have a reflectance distribution so that the reflectance is reduced at the heat spot-generating portion. Explanation will be made to such a projection device as a ninth embodiment according to the invention while referring to FIGS. 22 and 23. This embodiment is basically adapted so that a transmission type liquid crystal cell 702 is disposed, as described above, at a position illuminated by a reflection type OHP, that is, on a Fresnel reflection plate 701 and irradiated from a light source 703 by way of a lens 704. The Fresnel reflection plate 701 comprises a Fresnel lens 706 formed on a reflection layer 705. The transmission type liquid crystal cell 702 receives an image signal from the outside and displays the image as a pattern comprising a light transmitting portion pattern and a not-transmitting portion pattern. Accordingly, when the transmission type liquid crystal cell 702 is irradiated from the light source 703, the irradiation light is partially transmitted through the transmission type liquid crystal 702 depending on the image signals and reflected at the Fresnel reflection plate 701. The reflection light from the Fresnel reflection plate 701 is again transmitted through the transmission type liquid crystal cell 702 and then projected by way of a projection optical system 708 by a reflection mirror 707 on a screen (not illustrated). In this way, an image formed in the transmission type liquid crystal cell 702 is displayed under magnification.

The feature of this embodiment resides in the constitution of the reflection mirror 707. That is, the reflection mirror 707 comprises a transparent substrate 709 and an Al reflective film 710 formed by vapor deposition, in which reflection-reducing treatment is applied to the Al reflective film 710 to provide such a reflectance distribution that the reflectance is reduced at the heat spot-generating portion A. That is, the Al reflective film 710 is usually formed to a uniform film thickness of about 800 to 1000 Å as shown in FIG. 23(a). However, in this embodiment, the thickness of the Al reflective layer 710 is made uniform to about 800-1000 Å in the region B at the periphery of the heat spot-generating portion A, while the thickness of the Al reflective film 710 is made less than 500 Å in the heat spot-generating portion A so that the thickness is reduced toward the central portion as shown in FIG. 23(b). Generally, if the thickness of the Al reflective film 710 is more than 500 Å, the reflectance of the reflection mirror 707 is greater than 90% and, the layer thickness is usually made about from 800 to 1000 Å (in the region B other than the heat spot-generating portion). On the other hand, since the reflectance in the heat spot-generating portion A tends to become higher due to the heat spot, the film thickness of the Al reflective layer 710 is formed to less than 500 Å, thereby reducing the reflectance at the heat spot-generating portion A. Thus, the reflectance is substantially made uniform as a whole when considering the entire reflection mirror 707, thereby enabling to avoid such a state where only the heat spot-generating portion becomes brighter. Accordingly, the image projected on the screen is easy to see with a entirely uniform contrast.

The region to be applied with the reflection-reducing treatment and the layer thickness of the Al reflective layer 710 shown in FIG. 23(b) can properly be set depending on the size of the heat spot, the intensity of the irradiation light from the light source 703, etc. Further, although the reflectance-reducing treatment is applied to the reflection mirror 707 in this embodiment, it may be applied to the Fresnel reflection plate 701 or to both of them.

Figure 24:
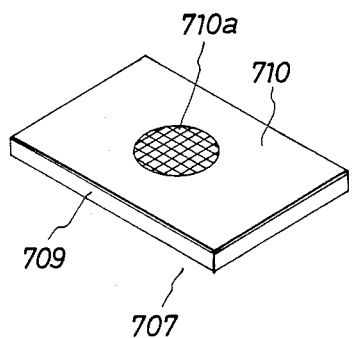
FIG. 24 is a view illustrating a modification of the ninth embodiment.

Next, a modification of this embodiment will be explained referring to FIG. 24. In this modification, the region of the heat spot-generating portion A in the reflection mirror 707 covered with the Al reflective layer 710 at uniform thickness is applied with a mesh-like Al reflection layer, thereby constituting the region as a low reflectance portion 710a as shown in FIG. 23(a). In the low reflectance portion 710a, it is preferred that the width of the portion not covered with the Al reflective layer is increased toward the central portion thereby reducing the reflectance.

Alternately, a treatment of forming a reflection preventive layer at a portion corresponding to the heat spot-generating portion A in the reflection mirror 707 may also be applied.

The material for the reflection preventive layer may be made of a transparent dielectric member such as magnesium fluoride formed by way of vapor deposition, etc. The layer thickness, size, etc. of the reflection preventive layer may properly be set depending on the light source, optical system, etc.

Figure 25:
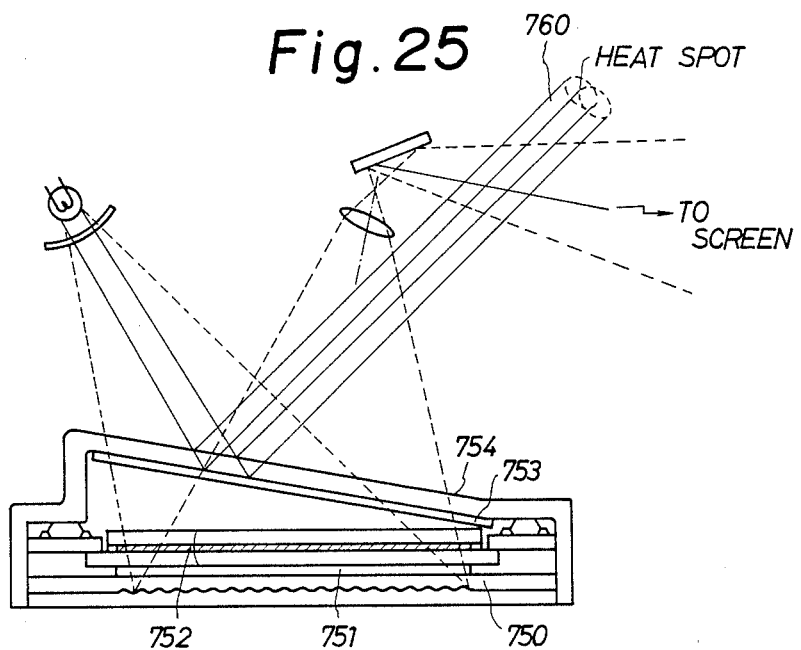
FIG. 25 is an explanatory view for the tenth embodiment according to the present invention.
Figure 26:
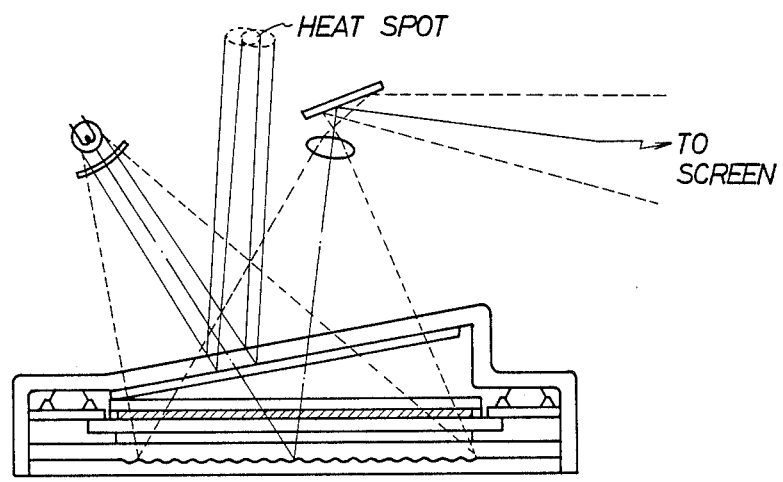
FIG. 26 is a view illustrating a modification of the tenth embodiment.
Figure 27:
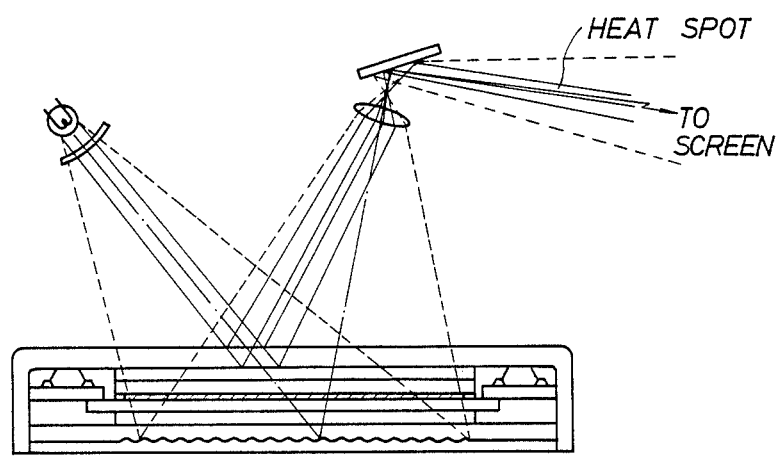
FIG. 27 is a view illustrating a heat spot generated from the conventional liquid crystal display device.

Then, the projection device of the invention wherein certain angle is made between the polarization plate as the second polarization means and the supporting plate of the liquid crystal device (i.e., the package member) to reflect the reflected light from each heat spot-generating portion of the polarization plate and the supporting plate in order that the reflected light goes out of optical system, can provide a magnified projection image with uniform contrast. Explanation will be made to such a projection device as a tenth embodiment according to the invention while referring to FIGS. 25 to 27. As shown in FIG. 25, a lower reflection plate 751 and a liquid crystal cell 752 are disposed on a Fresnel reflection plate 750 and a protection cover 754 having an upper polarization plate 753 bonded at the lower surface thereof is disposed. The liquid crystal cell 752 is brought into close contact with or adhered to the Fresnel reflection plate 750. The feature in this embodiment resides in the constitution of the protection cover 754 having the upper polarization plate. The heat spot due to the reflection light in the liquid crystal cell 752 below the upper polarization plate 753 and the lower polarization plate 751 is small compared with that at the upper polarization plate 753 and the protection cover 754 thereof, therefore most of the heat spot can be removed by eliminating the reflection light at the polarization plate 753 and the protection cover 754. The protection cover 754 having the upper polarization plate makes such an angle with the Fresnel reflection plate 750 that the reflection light from the heat spot-generating portion 760 goes out of the optical system. That is, the light transmitted through the liquid crystal cell 752 is reflected by the Fresnel reflection plate 750 and projected under magnification through the upper polarization plate 753 as usual, but the reflection light 760 at the heat spot portion on the upper polarization plate 753 and the upper surface of the protection cover 754 is reflected out of the optical system. The direction of reflection light at the heat spot portion may be as shown in FIG. 26 with a similar effect. FIG. 27 shows the state of reflection from the heat-spot generating portion in the conventional device.

The projection device of the invention, wherein a monoaxially oriented plastic film or non-stretched plastic film is used as substrates, the twisting angle of liquid crystal molecules is set within 180 to 250 degrees, the angle between the orientation direction of the liquid crystal molecule in contact with each of the substrates and the axis of transmission or the axis of absorption of the polarization members in adjacent with each of the substrates is set within 30 to 60 degrees, and further the product $d \cdot \Delta n$ between the refractive index anisotropy Δn of the liquid crystal and the thickness d of the liquid crystal layer is set so as to satisfy the relationship:

$$-0.0023\alpha + 1.2 \leq d.\Delta n \leq 0.0023\alpha + 1.5,$$

can prevent the projected image from blurring and colored iridescently. Explanation will be made to such a projection device as an eleventh embodiment according to the invention while referring to FIGS. 28 to 31.

Figure 30:
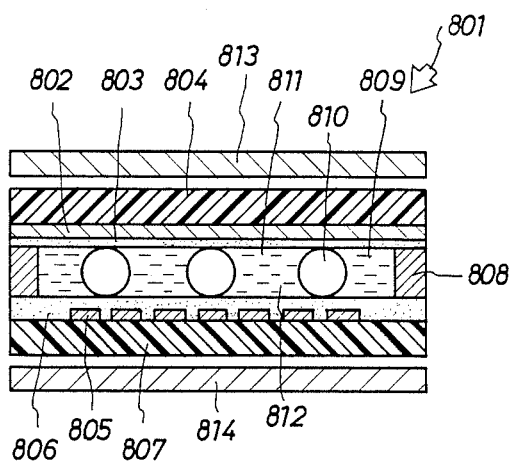
FIG. 30 is a transverse cross sectional view for the liquid crystal display device in the eleventh embodiment.

FIG. 30 illustrates a cross sectional structure of a liquid crystal display device 801 used in this embodiment. An upper substrate 804 having a transparent electrode 802 and an orientation film 803 formed on the inner surface thereof and a lower substrate 807 also having a transparent electrode 805 and an orientation film 806 formed on the inner surface thereof are disposed opposing to each other. Liquid crystals are sealed together with gap material 810 between the substrates 804 and 807. The opposing transparent electrodes 802 and 805 are formed, for example, so that they form a dot-matrix state. An upper polarization member 813 and a lower polarization member 814 are disposed on both sides of such a liquid crystal cell 812.

The substrates 804, 807 are made, for example, of a monoaxially oriented plastic film such as a monoaxially oriented polyester film. The orientation films 803, 806 are typically made of polymeric membranes such as of polyamide and polyimide applied with rubbing treatment. As liquid crystal molecules 809, those having positive dielectric anisotropy are used. Specifically, a typical example is a mixed liquid crystal comprising p type nematic liquid crystals incorporated with chiral nematic liquid crystals or cholestric liquid crystals.

The heat expansion coefficient of the monoaxially oriented plastic film for use in the substrates 804, 807 are different between the stretching direction and the direction in perpendicular thereto. However, even if the distance between the gaps is not uniform before sealing the liquid crystals, the gap distance can be made uniform due to the surface tension of the liquid crystal molecules 809 after sealing the liquid crystal by controlling the curing condition for the sealing material 808, liquid crystal sealing condition or extruding condition for excess liquid crystals upon liquid crystal sealing.

Further, such a monoaxially oriented plastic film has an optical anisotropy and includes optical axes in the stretching direction and the direction in perpendicular thereto. In view of the above, it is preferable to set the angle between the upper substrate 804 and the axis of transmission or the axis of absorption of the upper polarization member 813 within ±3 degree. In the same manner, it is also preferable to set the angle between the lower substrate 807 and the axis of transmission or the axis of absorption of the lower polarization member 814 within ±3 degree. The reason is that if the angle exceeds ±3 degree, the display contrast tends to be reduced.

The liquid crystal molecules 809 are oriented substantially horizontally to the surfaces of the substrates 804, 807, and the twisting angle α of the liquid crystal molecules 809 is from 180 to 250 degrees, preferably, from 180 to 220 degrees.

Figure 31:
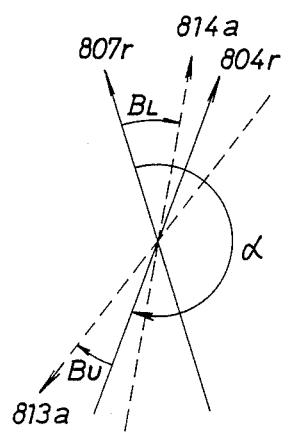
FIG. 31 is an explanatory view showing the twisted structure of the liquid crystal molecules.

FIG. 31 shows the state of a liquid crystal display device having such an angular relationship seen from the side of the lower polarization member 814 in a case where the liquid crystal molecules take a left-handed spiral structure when viewed from above.

The twisting angle α is shown as the angle between the rubbing directions 804r and 807r for the respective substrates 804, 807. If the twisting angle α is increased, scattered tissue tends to be formed near the threshold voltage level but the scattered tissue can be eliminated by decreasing the ratio between the liquid crystal layer thickness d and the pitch p of the liquid crystal molecules 809 (d/p). However, since a disclination is caused if the ratio d/p is excessively small, it is necessary that the ratio d/p is set to a value within such a range not causing the scattered tissue and the disclination. In view of the conditions above described, the upper limit of the twisting angle α is 250 degrees. On the other hand, since the contrast is lowered if the twisting angle α is reduced to less than 180 degrees, the lower limit of the angle is 180 degrees.

Further, the angle between the orientation direction of the liquid crystal molecules in contact with the upper and lower substrates 804, 807 (liquid crystal molecules on the substrate) and the axis of transmission or the axis of absorption of the polarization members 813, 814 in the vicinity of the substrates 804, 807 is set within a range from 30 to 60 degrees and, preferably, from 35 to 55 degrees. Referring to FIG. 31, the angle $\beta_L$ between the transmission axis 814a of the lower polarization member 814 and the orientation direction of the liquid crystal molecules 809 in contact with the lower substrate 809 (that is, rubbing direction 807r of the upper substrate 804) is within a range from 30 to 60 degrees. In the same manner, the angle $\beta_U$ between the transmission axis 813a of the upper polarization member 813 and the orientation direction of the liquid crystal molecules 809 in contact with the upper substrate 804 (that is, the rubbing direction 804r of the lower substrate 807) is within a range from 30 to 60 degrees. The contrast is increased by setting the angles $\beta_L$, $\beta_U$ in this way.

Further, while the liquid crystal molecules 809 have an anisotropy in the refractive index, it is set that the product d.Δn between the refractive index anisotropy Δn of the liquid crystal molecules 809 at the ambient temperature and the layer thickness d of the liquid crystal layer 811, can satisfy the following relationship:

$$-0.0023\alpha + 1.2 \leq d.\Delta n \leq 0.0023\alpha + 1.5.$$

For instance, in the case of using the reflection type OHP as shown in FIG. 28, since the substrate for the liquid crystal cell 812 is made of plastics and, particularly, the thickness of the lower substrate can be decreased, no double image is formed upon reflection projection. However, in the liquid crystal cell 812 having such a plastic film substrate, the liquid crystal cell 812 may be colored iridescent depending on the orientation conditions for the substrates 804, 807. Such iridescent coloration is not resulted if the liquid crystal cell is formed in such a state as capable of satisfying the foregoing relationship with respect to the product (d.Δn) of the refractive index anisotropy Δn of the liquid crystal molecules 809 and the liquid crystal layer thickness d.

Such a liquid crystal display device 801 is packaged as shown in FIG. 29 and set on an illumination plate 816 of a reflection type OHP 815 as shown in FIG. 28. As shown in FIG. 29, the liquid crystal display device 801 is entirely covered with a package 817, an LCD driving circuit substrate 818 connected to the substrate electrode is also mounted within the package 817 and a Fresnel reflection plate 819 is disposed at the lowermost layer. On the other hand, the reflection type OHP 815 comprises the illumination plate 816, a projector 821 supported by arms 820 extended above the illumination plate 816 and an irradiation light source (not illustrated), a projection lens 822, a reflection mirror 823, etc. Further, a drive control device connected to the LCD drive circuit substrate 818 by way of cables 824 is also disposed. An LCD controller 826 receives CRT signals from a computer 825 and delivers control signals to an inversion circuit 828 and a power source circuit 827 respectively.

In this embodiment, the inversion circuit 828 is disposed for applying a voltage to non information indicating portion, while not applying the voltage to information indicating portion of the liquid crystal cell 812. That is, the inversion circuit 828 is so adapted that it inverts usual signals outputted from the LCD controller 806 by passing them through an exclusive OR gate 29 and then deliveres them to the liquid crystal cell 812.

The polarization member 813, for example, of neutral gray or blue gray tone is used, while the other polarization member 814, for example, of purple or blue tone is used.

The axis of transmission or the axis of absorption of one polarization member 813 is disposed so as to make an angle of 90 degrees with that of the other polarization member 814.

By using such a liquid crystal display device 801, a projection device with a nearly white projected background can be obtained. As a result, in the case of projection by the reflection type OHP 815, the non information indicating portion applied with the voltage forms a substantially white area to obtain a projected image easy to see.

Although the substrates 804, 807 of the liquid crystal cell 812 are made of monoaxially oriented plastic films in this embodiment, they may be made of non-stretched plastic films. In this case, it is not necessary to set the angle between the substrate and the axis of transmission of the polarization member within ±3 degrees. It is only necessary that at least one of the two substrates 804 and 807 is made of a monoaxially oriented plastic film.

The magnifying projection device may either be a reflection type or transmission type.

What is claimed is:

1. A projection device for irradiating a light to a display device and optically magnifying and projecting a reflection light therefrom, comprising:
   a liquid crystal cell,
   a first polarization means and a reflection means disposed respectively on an opposite side from an irradiated side of said liquid crystal cell, and
   a second polarization means and optical magnifying means disposed respectively on an optical path of the reflection light reflected by said reflection means and outgoing from said liquid crystal cell, the first polarization means and the reflection means being integrally formed as a polarization-reflection plate made of a metal thin film, and the second polarization means being an optical analyzer.

2. A projection device for irradiating a light to a display device and optically magnifying and projecting a reflection light therefrom, comprising:
   a liquid crystal cell,
   a first polarization plate and a reflection type Fresnel lens disposed respectively on an opposite side from an irradiated side of said liquid crystal cell,
   ı second polarization plate and optical magnifying means disposed respectively on an optical path of the reflection light reflected by said reflection type Fresnel lens and outgoing from said liquid crystal cell, and
   a resilient pressing member disposed for contacting the reflection type Fresnel lens with the first polarization plate.

3. A projection device for irradiating a light to a display device and optically magnifying and projecting a reflection light therefrom, comprising:
   a liquid crystal cell,
   a first polarization means and a reflection means disposed respectively on an opposite side from an irradiated side of said liquid crystal cell, and
   a second polarization means and optical magnifying means disposed respectively on an optical path of the reflection light reflected by said reflection means and outgoing from said liquid crystal cell, only a light of a wavelength having greatest variation in an optical transmittance between ON and OFF states of a voltage that controls transmission/screening of the liquid crystal cell being substantially irradiated to the liquid crystal cell.

4. A projection device for irradiating a light to a display device and optically magnifying and projecting a reflection light therefrom, comprising:
   a liquid crystal cell,
   a first polarization plate and a reflection plate disposed respectively on an opposite side from an irradiated side of said liquid crystal cell, and
   a second polarization plate and optical magnifying means disposed respectively on an optical path of the reflection light reflected by said reflection plate and outgoing from said liquid crystal cell, a surface treatment being applied to a surface of the second polarization plate for preventing a generation of heat spot caused by a reflection of light at the surface of said second polarization plate.

5. A projection device for irradiating a light to a display device and optically magnifying and projecting a reflection light therefrom, comprising:
   a liquid crystal cell,
   a first polarization plate and a reflection type Fresnel lens disposed respectively on an opposite side from an irradiated side of said liquid crystal cell, and
   a second polarization plate and optical magnifying means disposed respectively on an optical path of the reflection light reflected by said reflection type Fresnel lens and outgoing from said liquid crystal cell, a surface treatment being applied to at least one of the reflection type Fresnel lens and a mirror for reflecting said reflection light outgoing from the liquid crystal cell for preventing a generation of heat spot caused by a reflection of the light at surfaces thereof.

6. A projection device for irradiating a light to a display device and optically magnifying and projecting a reflection light therefrom, comprising:
   a liquid crystal cell,
   a first polarization plate and a reflection plate disposed respectively on an opposite side from an irradiated side of said liquid crystal cell,
   a second polarization plate and optical magnifying means disposed respectively on an optical path of the reflection light reflected by said reflection plate and outgoing from said liquid crystal cell, and
   a cover plate for covering said second polarization plate, said second polarization plate and said cover plate being disposed at an angle relative to said reflection plate for preventing a generation of heat spot caused by a reflection of the light at surfaces thereof.

7. A projection device for irradiating a light to a display device and optically magnifying and projecting a reflection light therefrom, comprising:
- a cell having liquid crystal layer contained between a pair of transparent plates made of plastic films,
- a first polarization means and a reflection means disposed respectively on an opposite side from an irradiated side of the cell, and
- a second polarization means and optical magnifying means disposed respectively on an optical path of the reflection light reflected by said reflection means and outgoing from the cell, a twisting angle $\alpha$ of liquid crystal molecules in the liquid crystal layer being set within a range from 180 to 250 degrees, an angle between an orientation direction of the liquid crystal molecules on each of the transparent plates and an axis of transmission or an axis of absorption of the polarization means adjacent to each of the transparent plates being set within a range from 30 to 60 degrees, a product $d \Delta n$ between refractive index anisotropy $\Delta n$ of the liquid crystal layer at an ambient temperature and thickness d of the liquid crystal layer being set so as to satisfy the relationship:

$$-0.0023\alpha + 1.2 \leq d \Delta n \leq 0.0023\alpha + 1.5$$

one of said polarization means being disposed so that the axis of transmission or the axis of absorption makes an angle of 90 degrees with respect to that of the other of said polarization means, and inversion circuit being connected to the cell for not applying a voltage to an information indicating portion and applying the voltage to a non information indicating portion of said liquid crystal layer.

8. A projection device for irradiating a light to a display device and optically magnifying and projecting a reflection light therefrom, comprising:
- a cell having a liquid crystal layer contained between a pair of transparent plates made of plastic films,
- a first polarization plate and a reflection type Fresnel lens disposed respectively on an opposite side from an irradiated side of the cell, and
- a second polarization plate and optical magnifying means disposed respectively on an optical path of the reflection light reflected by said reflection type Fresnel lens and outgoing from the cell, a distance between a liquid crystal layer in the cell and the reflection type Fresnel lens being less than 1.5 mm.

* * * * *